(12) United States Patent
Meng et al.

(10) Patent No.: US 10,102,026 B2
(45) Date of Patent: *Oct. 16, 2018

(54) MIGRATING VIRTUAL ASSET

(71) Applicant: INTERNATIONAL BUSINESS MACHINES CORPORATION, Armonk, NY (US)

(72) Inventors: Fan Jing Meng, Beijing (CN); Yuan Wang, Beijing (CN); Jing Min Xu, Beijing (CN); Bo Yang, Beijing (CN); Yang Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,258

(22) Filed: Mar. 10, 2017

(65) Prior Publication Data
US 2017/0185442 A1 Jun. 29, 2017

Related U.S. Application Data

(63) Continuation of application No. 14/834,472, filed on Aug. 25, 2015, now Pat. No. 9,667,472.

(30) Foreign Application Priority Data

Aug. 28, 2014 (CN) .......................... 2014 1 0433277

(51) Int. Cl.
*G06F 9/455* (2018.01)
*H04L 12/24* (2006.01)
(Continued)

(52) U.S. Cl.
CPC ........ *G06F 9/45558* (2013.01); *H04L 41/046* (2013.01); *H04L 41/0846* (2013.01);
(Continued)

(58) Field of Classification Search
None
See application file for complete search history.

(56) References Cited

U.S. PATENT DOCUMENTS 7,222,141 B2 * 5/2007 Zondervan ........ G06F 17/30581
2011/0214124 A1 * 9/2011 Ferris ...................... G06F 8/63
718/1

(Continued)

FOREIGN PATENT DOCUMENTS

| CN | 101827101 A | 9/2010 |
|----|-------------|--------|
| CN | 102571905 A | 7/2012 |
| CN | 103399791 A | 11/2013 |

OTHER PUBLICATIONS

List of IBM Patents or Patent Applictions Treated as Related; (Appendix P), Filed Mar. 13, 2017, 2 pages.

(Continued)

*Primary Examiner* — Gregory A Kessler
(74) *Attorney, Agent, or Firm* — Cantor Colburn LLP; Vazken Alexanian

(57) ABSTRACT

Embodiments include methods and devices for migrating virtual assets over networks that have a first manager connected to a physical host a virtual machine run. Aspects include registering the physical host to a second manager in the network, creating the mapping relationship of the physical host between a database of the first manager and a database of the second manager and importing instance data and status data of the virtual machine of the physical host from the database of the first manager into the database of the second manager. Aspects also include switching the management for the physical host from the first manager to the second manager.

6 Claims, 6 Drawing Sheets

(51) Int. Cl.
 *H04L 29/08* (2006.01)
 *G06F 9/48* (2006.01)
(52) U.S. Cl.
 CPC ............ *H04L 67/32* (2013.01); *G06F 9/4856* (2013.01); *G06F 2009/4557* (2013.01)

(56) References Cited

U.S. PATENT DOCUMENTS

2014/0115161 A1\* 4/2014 Agarwal ............ G06F 9/45558
 709/226
2016/0062786 A1 3/2016 Meng et al.
2016/0112243 A1 4/2016 Meng et al.

OTHER PUBLICATIONS

Meng, Fan Jing Meng, et al., Pending U.S. Appl. No. 15/456,762 entitled "Migrating Virtual Asset," filed with the U.S. Patent and Trademark Office on Mar. 13, 2017.
Chinese Office Action for Application No. 201410433277.3; dated Feb. 27, 2018; 8 pgs.

\* cited by examiner

MIGRATING VIRTUAL ASSET

DOMESTIC AND FOREIGN PRIORITY

This application is a continuation of U.S. patent application Ser. No. 14/834,472, filed Aug. 25, 2015; published as US20160062786A1 on Mar. 3, 2016 which claims priority to Chinese Patent Application No. 201410433277.3, filed Aug. 28, 2014, and all the benefits accruing therefrom under 35 U.S.C. § 119, the contents of which in its entirety are herein incorporated by reference.

BACKGROUND

The present disclosure relates to networks and technology of cloud computing, and more specifically to a method and device for migrating virtual assets over networks.

Migrating legacy virtual assets to cloud side is a key point for many customers who have started with virtual technology and want to change and update to cloud. Motivations of cloud migration of general virtual asset mainly include: unifying resource management, that is, running a unified management system on a single platform; acquiring new features provided by cloud technology, such as dynamic extension, high availability, etc.; reusing legacy virtual assets, which have been created and used in existing cloud for a long time, in the new environment; and balancing workload across resource pools and so on.

A general method for cloud migration of virtual assets is to export a virtual machine (VM) instance, to convert it into an image file package, to transport (transfer) the file package, to import the file package into a target cloud computing platform (CCP), and to register and run the VM instance on a physical host of the target CCP. Thus, the VM in the source CCP may be migrated to the target CCP.

Types of cloud migration of virtual assets include: internal migration that VM is migrated between physical hosts in the same CCP; cross cloud migration that VM is migrated between physical hosts in different CCPs; topo-based migration that a set of VMs with internal dependency are migrated between different CCPs; and bundle-based migration that VMs and physical hosts with internal dependency are migrated together between different CCPs.

Currently cross cloud migration of virtual assets includes shutting down the VM, which may cause business disruptions. Furthermore, conversion of VM file package needs a long time, transportation cost of the file package also depends on the network performance, and meanwhile compatibility configuration for the new environment needs to be performed by professionals. As a result, failure rate of migration is very high.

SUMMARY

The present disclosure puts forward a new technical scheme for migrating virtual assets, in which the management layer of for example a first computing platform (manager) is migrated to the management layer of a second computing platform, instead of migrating VMs and physical hosts with internal dependency on the first computing platform to the second computing platform through a method of VM image transportation.

According to one aspect of the present disclosure, there is provided a method for migrating virtual assets over networks having a first manager and a physical host connected, the physical host having a virtual machine run thereon, the method includes: registering the physical host to a second manager in the network; creating the mapping relationship of the physical host between a database of the first manager and a database of the second manager; importing instance data and status data of the virtual machine of the physical host from the database of the first manager into the database of the second manager; and switching the management of the physical host from the first manager to the second manager According to another aspect of the present disclosure, there is provided a device for migrating virtual assets over networks, having a first manager and a physical host connected, the physical host having a virtual machine run thereon, the device comprising: a registration module configured to register the physical host to a second manager in the network; a mapping module configured to create the mapping relationship of the physical host between a database of the first manager and a database of the second manager; an instance conversion module configured to import instance data and status data of the virtual machine of the physical host from the database of the first manager into the database of the second manager; and a redirection module configured to switch the management of the physical host from the first manager to the second manager.

With the method and device for migrating virtual assets of the present disclosure, the business disrupt seldom occurs during migration, VM does not need to be converted to a file package, and there is no transportation of the VM file package and hardware position change either. This keeps the basic configuration of legacy virtual assets such as physical host, VM, network and so on, and it is easy to realize automated process.

BRIEF DESCRIPTION OF THE DRAWINGS

Through the more detailed description of exemplary embodiments of the present disclosure in combination with the accompanying drawings, the above and other objects, features and advantages of the present disclosure will become more apparent, wherein the same reference generally refers to the same components in the exemplary embodiments of the present disclosure.

DETAILED DESCRIPTION

Figure 1A:
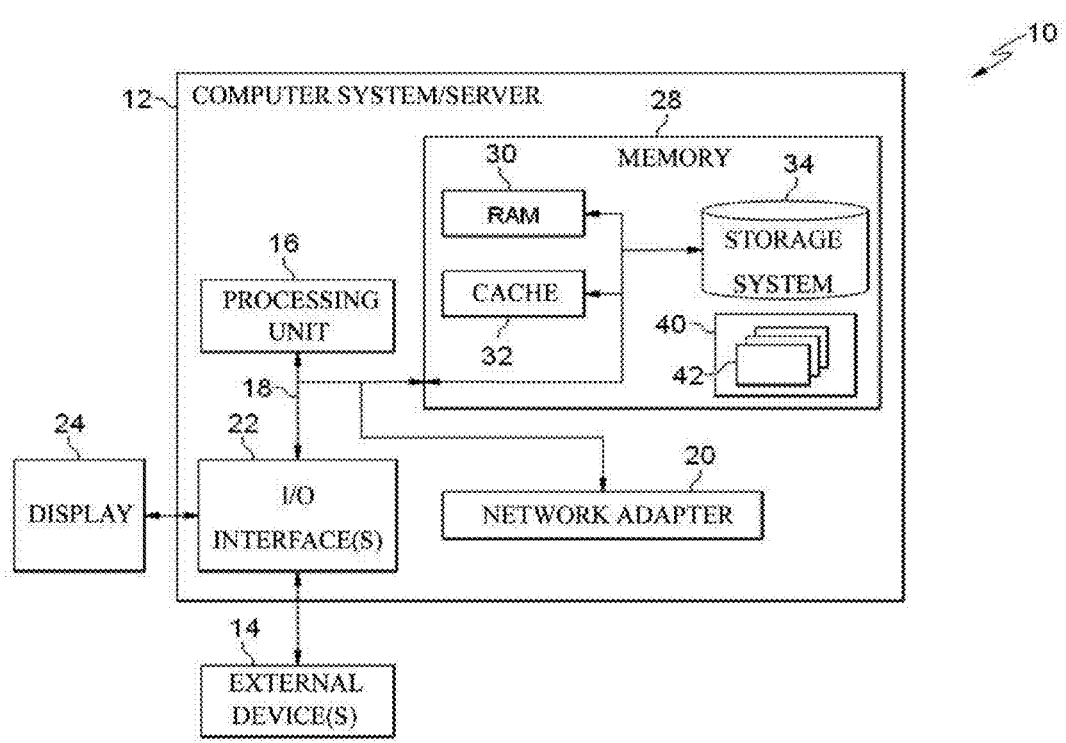
FIG. 1(a) represents a cloud computing node according to one embodiment of the present disclosure.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1(a), a schematic of an example of a cloud computing node is shown. Cloud computing node 10 shown in FIG. 1(a) is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 1B:
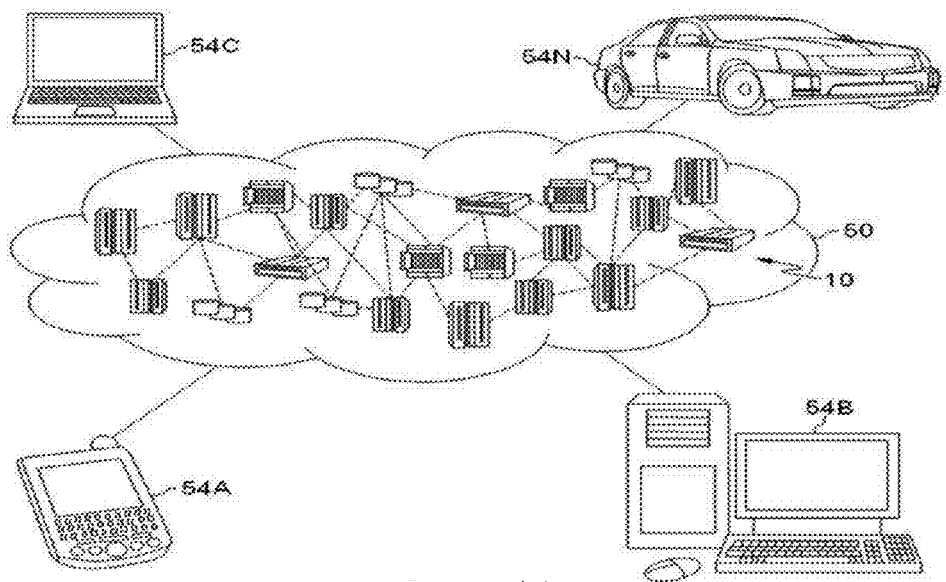
FIG. 1(b) represents the cloud computing environment according to one embodiment of the present disclosure.
Figure 1C:
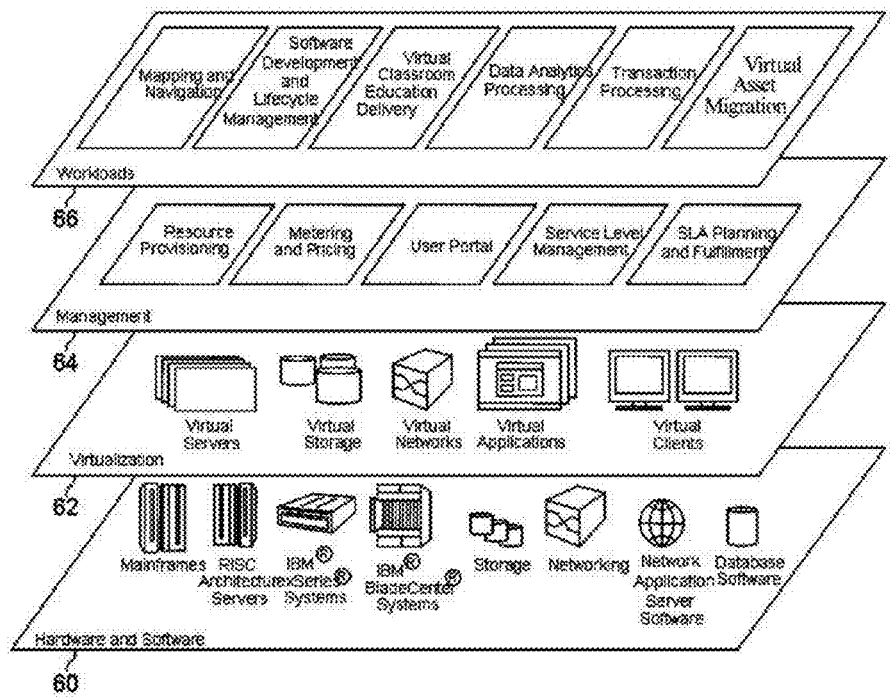
FIG. 1(c) represents an abstract model layer according to one embodiment of the present disclosure.

As shown in FIG. 1(*a*), computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
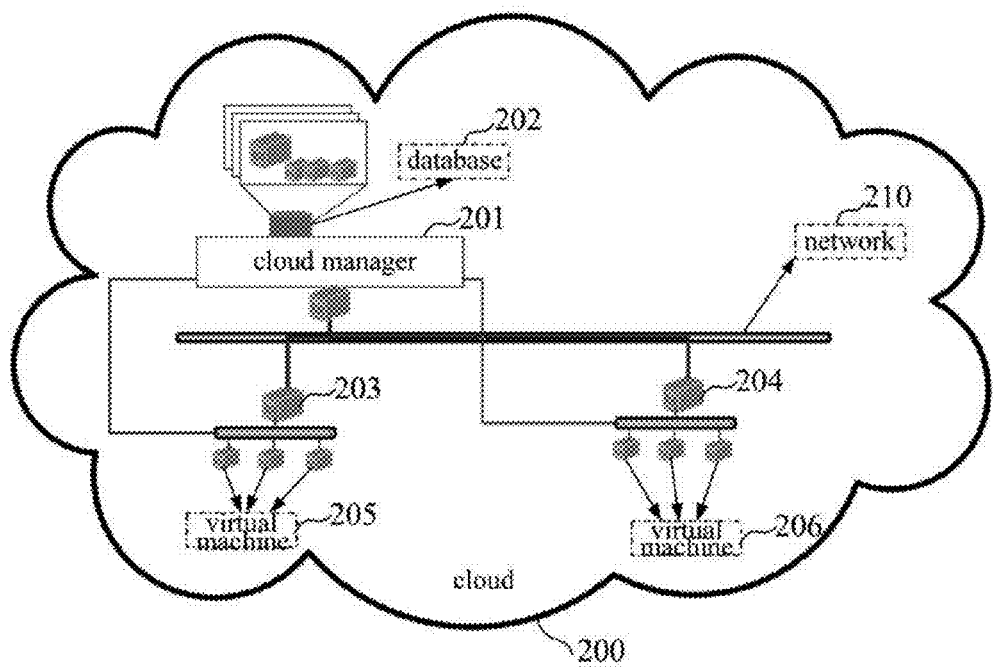
FIG. 2 shows a basic topology of a cloud side applied in the present disclosure.

Referring now to FIG. 1(*b*), illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
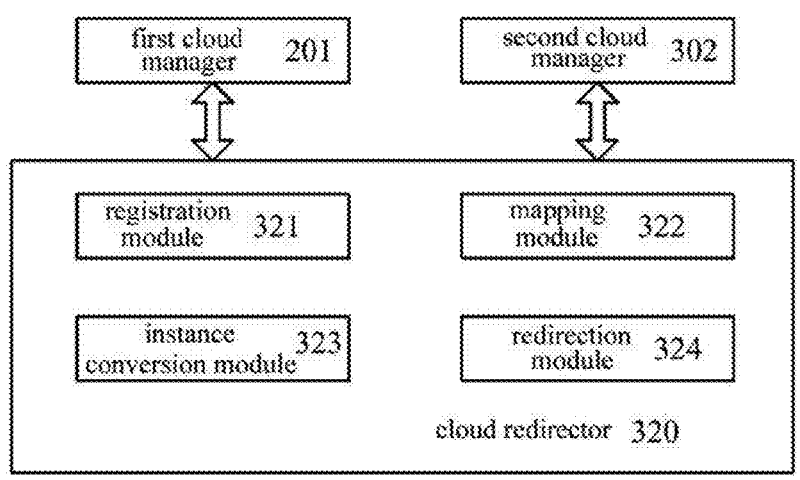
FIG. 3 shows a block diagram of a device for migrating virtual assets over networks according to one embodiment of the present disclosure.

Referring now to FIG. 1(*c*), a set of functional abstraction layers provided by cloud computing environment 50 (FIG. 1(*b*)) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual asset migration.

In the following, several terms which may be used in the specification are explained as follows.

Cloud (or cloud side): it consists of a cloud management platform, a physical host managed by the cloud management platform and a VM run on the physical host connected over network.

Cloud computing platform: it is the cloud management platform of entire cloud side, and is used for performing cloud processing such as storing and/or computing, etc. and issuing various instructions to the physical host managed by it. It may also be referred to as "manager" or "cloud manager".

Physical host: it is connected with the cloud manager over network, it is the host machine of a VM, receives various instructions of the cloud manager through a controller agent so as to run, change or stop a VM application thereon, and reports the processing result to the cloud manager.

Virtual Machine (VM): it is an application run on the physical host and may complete various tasks and functions so as to provide cloud services. The above explanation is only exemplary and do not limit the scope of the present disclosure.

FIG. 2 shows a basic topology of a cloud side applied in the present disclosure. The basic topology of the cloud side 200 applied in the present disclosure includes a cloud manager 201, a database 202 of the cloud manager 201, physical hosts 203 and 204 which may be multiple, multiple VMs 205 and 206 which are run on physical hosts so as to provide cloud services, and network 210 which connects the cloud manager 201 and physical hosts 203 and 204 and connects the cloud side 200 with the external network so as to provide the access service.

FIG. 3 shows a block diagram of a device for migrating virtual assets over networks according to one embodiment of the present disclosure.

As shown in FIG. 3, the present disclosure provides a device for migrating virtual assets over networks. In the following, in embodiments of the present disclosure, the above device for migrating virtual assets is represented by a cloud redirector (CR) 320. The cloud side 200 according to an embodiment of the present disclosure has a manager (which may be referred to as "first manager" or "source manager" below, and may also be referred to as "first cloud manager" or "source cloud manager" since it refers to the cloud manager of virtual assets before migration) 201, physical hosts 203 and 204 which are managed by the first cloud manager 201, connected over the network 210, and VMs 205 and 206 run on the physical hosts 203 and 204. The cloud redirector 320 according to an embodiment of the present disclosure is also connected to a second manager (which may be referred to as "second cloud manager" or "target manager", and may also be referred to as "target cloud manager" since it is the destination where the virtual assets are to be migrated) 302.

The cloud redirector 320 according to an embodiment of present disclosure includes: a registration module 321 configured to register the physical hosts 203 and 204 to the second cloud manager 302 in the network 210, a mapping module 322 configured to create the instance mapping relationship of the physical hosts 203 and 204 between the database 202 of the first cloud manager 201 and the database 303 of the second cloud manager 302, an instance conversion module 323 configured to import, based on the created mapping relationship, instance data and status data of VMs of the physical host 203 and 204 from the database 202 of the first cloud manager 201 into the database 303 of the second cloud manager 302, and a redirection module 324 configured to switch the management of the physical hosts 203 and 204 from the first cloud manager 201 to the second cloud manager 302.

The cloud redirector 320 according to an embodiment of present disclosure may further include (the following units are not shown in the figure) a Central Processing Unit (CPU) for executing related programs to process various data and control operations of respective components (units) in the cloud redirector 320, a Read Only Memory (ROM) for storing various programs required for performing various process and control by the CPU, a Random Access Memory (RAM) for storing intermediate data temporarily produced in the procedure of process and control by the CPU, an Input/Output (I/O) component for connecting with external devices so as to transport various data between the external devices and the cloud redirector 320 according to an embodiment of present disclosure, and user interface (I/F) components including a keyboard, a mouse, a touch pad and other components which may be implemented by various display apparatuses or voice apparatuses to perform interaction with users. These apparatuses or components are coupled with the registration module 321, the mapping module 322, the instance conversion module 323, the redirection module 324 and so on in the cloud redirector 320 via data bus and/or control bus to perform various controls and related operations, so as to realize various functions of the present disclosure to provide cloud services.

According to one embodiment of present disclosure, functions of the registration module 321, the mapping module 322, the instance conversion module 323, the redirection module 324 may also be implemented by that programs are stored in ROM and executed in CPU to complete respective functions. According to one embodiment of present disclosure, respective apparatus, modules and units in the cloud redirector 320 may also be implemented by being combined as one component, and their specific implementation does not limit the scope of the present disclosure.

According to one embodiment of present disclosure, the cloud redirector 320 may be implemented by running a computer program in the exemplary computer system/server 12 as shown in FIG. 1. In the following, the operation to realize cloud migration of virtual assets of the cloud redirector 320 according to an embodiment of present disclosure will be described in detail.

The cloud redirector 320 according to the present disclosure extracts various information of the first cloud manager 201, including the software name, the version number, the ip address, the mac address, the network configuration parameters, the user name and password of the first cloud manager 201, as well as the user name and password of the database of the first cloud manager 201 and so on. Meanwhile, the cloud redirector 320 further extracts the topology information of the first cloud manager 201, such as the number (although there are shown two physical hosts in the specification, there may be more or less physical hosts as needed in an actual system) of physical hosts 203 and 204 managed by the first cloud manager 201, and the number (there are shown three VMs on each physical host in the specification, more or less VMs may be run as needed in an actual system) of VMs 205 and 206 on each physical host and so on. The above information data may for example be extracted from the first cloud manager 201 by running a script file in the cloud redirector 320. The above extracted information data are enrolled (registered) in the cloud redirector 320.

Figure 4:
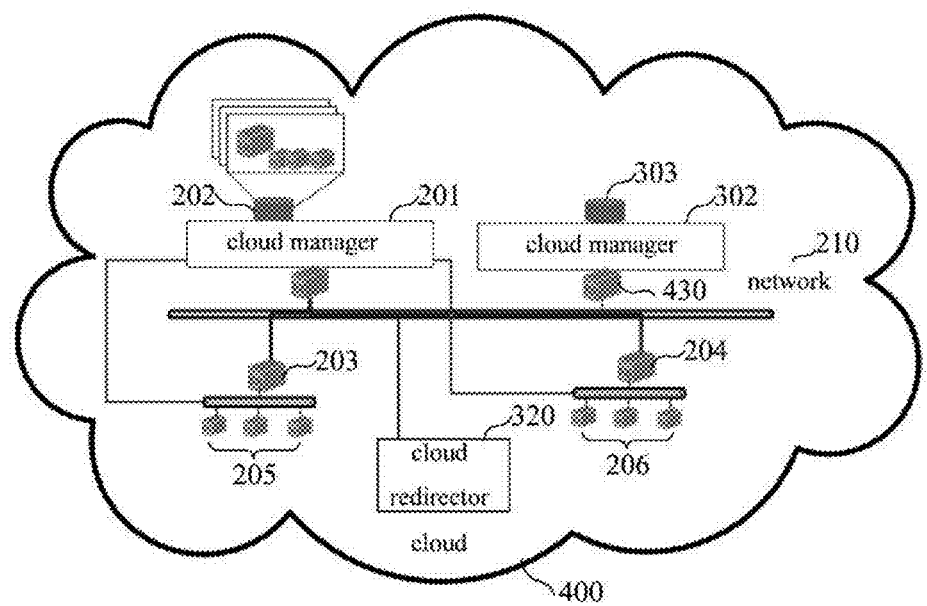
FIG. 4 is a diagram showing that a second manager is established in the network with a first manager.

FIG. 4 is a diagram showing that a second cloud manager is established in the network with a first cloud manager. As shown in FIG. 4, the cloud redirector 320 according to the present disclosure is connected to the network 210, and includes a module for establishing a new server in the network 210, a module for installing the second cloud manager 302 on the new server 210 and a module for starting the second cloud manager 302.

The module for establishing the new server in the network 210 establishes a new target server 430 in the network 210 where the first cloud manager 201 is located. This operation may be realized by adding a new physical server in the network 210. According to one embodiment of the present disclosure, the above added new physical server 430 may be implemented by the exemplary computer system/server 12 as shown in FIG. 1(a).

The module for installing the second cloud manager 302 on the new server 210 installs the second cloud manager 302 in the newly added target server 430. The second cloud manager 302 may be a software program and realizes the function of managing physical hosts and VMs run on the physical hosts by being installed on the new server 430. According to one embodiment of present disclosure, the second cloud manager 302 may also be a physical hardware device and realizes the corresponding functions by connecting to the network 210. The module for starting the second cloud manager 302 starts the second cloud manager 302 on the target server 430.

The cloud redirector 320 according to the present disclosure extracts various information of the second cloud manager 302, including the software name, the version number, the ip address, the mac address, the network configuration parameters, the user name and password of the second cloud manager 302, as well as the version information, the user name and password of the database of the second cloud manager 302 and so on, and enrolls them in the cloud redirector 320. At this time, since the newly started second cloud manager 302 has not managed any physical host and VM, the cloud redirector 320 does not extract the topology information of the second cloud manager 302. The above information data may for example be extracted from the second cloud manager 302 be running a script file in the cloud redirector 320.

The cloud redirector 320 according to the present disclosure may further include a module for extracting the installation package of the controller agent and its configuration information from the second cloud manager 302. The module extracts the installation package of the controller agent and its configuration information from the second cloud manager 302, and stores them in the cloud redirector 320. Here, the controller agent may be a software program which may receive, by running in a physical host, various instructions from the second cloud manager, manage physical hosts and return the resulting data to the second cloud manager.

According to one embodiment of present disclosure, the registration module 321 is further configured to stop the management service of the first cloud manager 201, to install the controller agent of the second cloud manager 302 on the physical hosts 203 and 204, and to configure and run the controller agent so as to register (the identification information of) the physical hosts 203 and 204 to the second cloud manager 302.

According to another embodiment of present disclosure, the pre-storage position of the installation package of the controller agent and its configuration information does not limit the technical scope of the present disclosure. They may also be stored in any other device than the second cloud manager 302, for example, may be pre-stored in the cloud redirector 320 or the physical hosts 203 and/or 204, only if the installation package of the controller agent and its configuration information exist on the physical hosts 203 and 204 before the controller agent is installed on the physical hosts 203 and 204.

Figure 5:
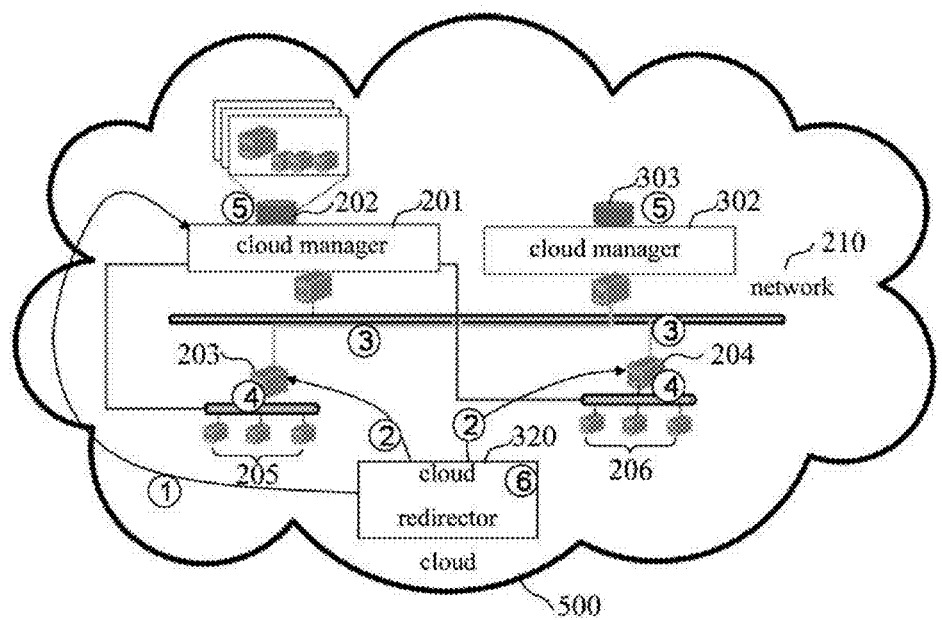
FIG. 5 is a diagram showing that a physical host is re-registered according to an embodiment of the present disclosure.

FIG. 5 is a diagram showing that a physical host is re-registered according to an embodiment of the present disclosure. Specifically, as shown in FIG. 5, at operation ①, the management service of the first cloud manager 201 is stopped; at operation ②, the cloud redirector 320 installs controller agents of the second cloud manager 302 on as-is physical hosts 203 and 204 of the first cloud manager 201; and at operation ③, the cloud redirector 320 configures and runs these controller agents and registers the as-is physical hosts 203 and 204 to the second cloud manager 302 over the network 210. The order relationship of the above operations ①, ② and ③ do not limit the scope of the present disclosure. According to another embodiment of present disclosure, the operations ①, ② and/or ③ may be performed simultaneously. Alternatively, the operations ② and/or ③ may be performed firstly, and the operation ① is then performed.

More specifically, the operation that the as-is physical hosts 203 and 204 are registered to the second cloud manager 302 is completed by configuring and running controller agents of the second cloud manager on the physical hosts 203 and 204. After the controller agents of the second cloud manager 302 are installed to the physical hosts 203 and 204 via the cloud redirector 320 of the present disclosure and are configured and run in accordance with the information (the ip address, the communication port "port", the authentication information, etc) of the second cloud manager 302, the controller agents will establish the communication connection with the server of the second cloud manager 302 automatically, and transmits the information (which is decided specifically by the design of the second cloud manager 302) of the physical hosts 203 and 204 collected by them to the server of the second cloud manager 302. Thus, registration is completed. In this way, in the database of the second cloud manager 302, the physical host data table will generate a piece of information record regarding the registered physical host. In general, the collected information of the physical host mainly includes: the CPU information, the memory information, the disk storage information, the system type, the ip address, the mac address, the host name, etc. Meanwhile, an ID will be assigned or a globally-unique identification information "guid" will be produced for each physical host in a host storage table. The ID/guid will be referred to by other tables so as to associate with the physical host. For example, in a VM list, for a VM, an attribute such as host_id (ID/guid of the physical host is stored therein) is used to identify to which physical host the VM belongs.

According to one embodiment of present disclosure, the mapping module 322 is further configured to extract the identity information of the physical hosts 203 and 204, to locate, based on the identity information, the related records of the physical hosts 203 and 204 in the databases 202 and 303 of both the first cloud manager 201 and the second cloud manager 302, and to create the instance mapping relationship of the physical hosts 203 and 204 between the database 202 of the first cloud manager 201 and the database 303 of the second cloud manager 302 according to the located records. Here, the identity information includes at least one of the ip address, mac address, host name, ID, guid, etc as described above. Here, the related records refer to records including information on the physical hosts 203 and 204, in the databases 202 and 303, such as the configuration information, and the instance data and status data of related VMs.

Specifically, as shown in FIG. 5, at operation ④, the cloud redirector 320 searches the physical hosts 203 and 204 for their identity information, for example, host names, ip addresses, mac addresses, ids, guids, etc of the physical hosts 203 and 204; at operation ⑤, by using the searched identity information of the physical hosts 203 and 204, records related with the physical hosts 203 and 204 are extracted from the database 202 of the first cloud manager 201 and the database 303 of the second cloud manager 302; the above extraction of related records may also be the locating of records of the physical hosts 203 and 204 in the database 202 and the locating of records of the physical hosts 203 and 204 in the database 303; at operation ⑥, in the cloud redirector 320, the mapping relationship of as-is physical hosts 203 and 204 between the database 202 of the first cloud manager 201 and the database 303 of the second cloud manager 302, for example, but not limited to, a mapping table M, is established.

According to one embodiment of present disclosure, the mapping table M is for establishing the association of physical host instances between two databases, that is, associating the id of a physical host in the as-is cloud manager with the id of the physical host in the target cloud manager. Therefore, the information in the mapping table M mainly includes the information capable of uniquely identifying the physical host in the two cloud managers. An example is shown as follows:

TABLE Physical_Machine_Mapping (
hostname,//host name of a physical host
ip,//IP address of the physical host
mac,//Mac address of the physical host
source_id,//ID of the physical host in the as-is cloud management platform
target_id,//ID of the physical host in the target cloud management platform
source_table,//host table name of the physical host in the as-is cloud management platform
target_table,//host table name of the physical host in the target cloud management platform
source_guid,//globally-unique identifier of the physical host in the as-is cloud management platform
target_guid,//globally-unique identifier of the physical host in the target cloud management platform)

According to one embodiment of present disclosure, the above exemplary mapping table M is only one of examples for realizing the mapping relationship of the present disclosure, which does not limit the scope of the present disclosure.

According to one embodiment of present disclosure, the instance conversion module 323 further includes a module for stopping the controller agents of the first cloud manager 201 on the physical hosts 203 and 204, a module for stopping the management service of the second cloud manager 302, a module for extracting the information data of the physical hosts 203 and 204 as well as the instance data and the status data of their VMs from the database 202 of the first cloud manager 201 according to the mapping relationship (for example the mapping table M), a module for extracting the information data of the physical hosts 203 and 204 from the database 303 of the second cloud manager 302 as the docked point data according to the mapping relationship (for example the mapping table M), a module for converting the instance data and the status data of the database 202 of the first cloud manager 201 into the instance data and the status data of the database 303 of the second cloud manager 302 according to predefined metadata mapping in databases, and a module for importing the converted instance data and the status data into the database 303 of the second cloud manager 302 by using the docked point data. Here, the above docked point data refer to the index data which exist in both the databases 202 and 203 and associate the information data of the physical hosts 203 and 204 in the two databases 202 and 203 with each other.

Figure 6:
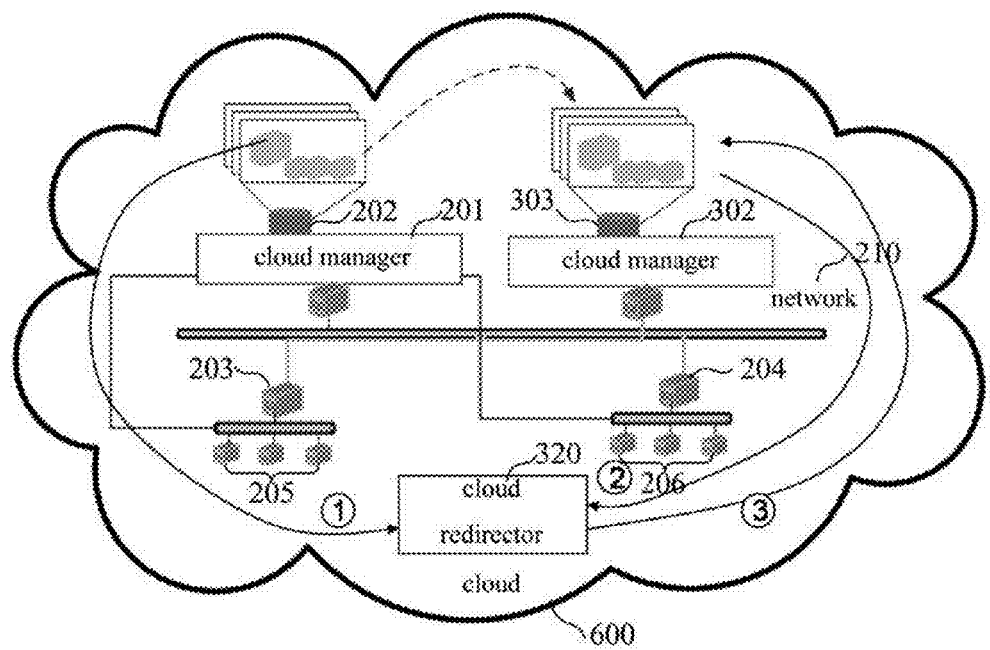
FIG. 6 is a diagram showing that VM instance data are converted according an embodiment of the present disclosure.

FIG. 6 is a diagram showing that VM instance data are converted according an embodiment of the present disclosure. As shown in FIG. 6, at operation ①, the cloud redirector 320 extracts the data (for example data of the identity information and configuration information and so on) of the physical hosts 203 and 204 as well as the instance data and the status data of VMs 205 and 206 run thereon from the database 202 of the first cloud manager 201 according to the instance mapping relationship (for example the mapping table M). At operation ②, the cloud redirector 320 extracts the data (for example data of the identity information and configuration information and so on) of the physical hosts 203 and 204 from the database 303 of the second cloud manager 302 according to the instance mapping relationship (for example the mapping table M). At operation ③, the instance data and the status data of VMs 205 and 206 on the physical hosts 203 and 204 are reconstructed in the database 303 of the second cloud manager 302 according to the predefined metadata mapping in databases, that is, the instance data and the status data of VMs 205 and 206 of the physical hosts 203 and 204 in the database 202 of the first cloud manager 201 are converted into the instance data and the status data thereof in the database 303 of the second cloud manager 302.

More specifically, in FIG. 6, the management data for the physical hosts 203 and 204 in the first cloud manager 201 are grafted into the database of the second cloud manager 302. For example, the following operations may be performed: 1. the controller agents of the first cloud manager 201 are stopped on the physical hosts 203 and 204; 2. the management service of the second cloud manager 302 is stopped; 3. the database 202 of the first cloud manager 201 is accessed, and the data of the physical hosts 203 and 204 as well as the instance data and the status data of VMs are extracted according to the mapping relationship (for example the mapping table M); 4. The database 303 of the second cloud manager 302 are accessed, and the data of the mapped physical hosts 203 and 204 are extracted as the docked point data according to the mapping relationship (for example the mapping table M); 5. the VM instance data and status data in the database 202 of the first cloud manager 201 are converted into the VM instance data and status data in the database 303 of the second cloud manager 302 by using the predefined metadata mapping; 6. The converted VM instance data and status data imported into the database 303 of the second cloud manager 302 by referring to the above docked point data. The above operations may be completed by corresponding modules in the instance conversion module 323.

According to one embodiment of present disclosure, the redirection module 324 further includes a module for starting the management service of the second cloud manager 302, a module for starting controller agents of the second cloud manager 302 on the physical hosts 203 and 204, a module for verifying the status of the second cloud manager 302, and a module for removing the controller agents of the first cloud manager 201 from the physical hosts 203 and 204.

Figure 7:
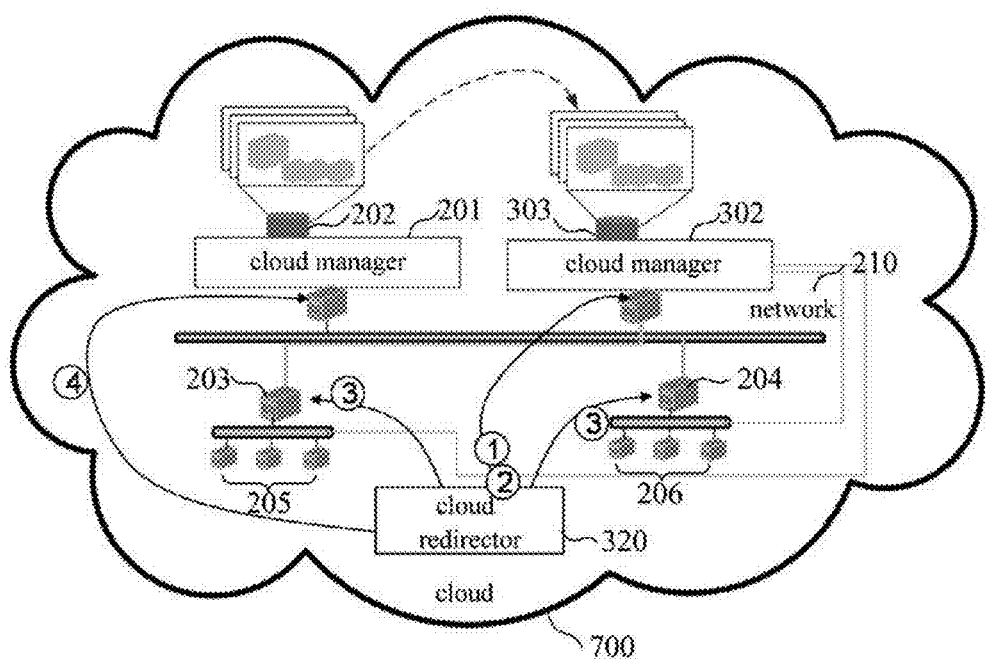
FIG. 7 is a diagram showing that a physical host and a VM are redirected according an embodiment of the present disclosure.

FIG. 7 is a diagram showing that a physical host and a VM are redirected according an embodiment of the present disclosure. As shown in FIG. 7, at operation ①, the cloud redirector 320 starts the management service of the second cloud manager 302, and starts controller agents of the second cloud manager 302 on the physical hosts 203 and 204. At operation ②, the status of the second cloud manager 302 is verified. For example, the status of the second cloud manager 302 may be verified by establishing VMs on the physical hosts 203 and 204 and starting or stopping VMs or by refreshing statuses of the physical hosts 203 and 204. At operation ③, the cloud redirector 320 removes controller agents of the first cloud manager 201 from the physical hosts 203 and 204.

According to one embodiment of present disclosure, the cloud redirector 320 further includes a module for starting the management service of the first cloud manager 201. As shown in FIG. 7, at operation ④, the cloud redirector 320 re-starts the management service of the first cloud manager 201. In this way, after a part of virtual assets of the first cloud manager 201 have been migrated to the second cloud manager 302, the first cloud manager 201 may still continue running so as to manage the other remaining virtual assets which are not migrated.

According to one embodiment of present disclosure, before the technical scheme of the present disclosure are implemented, it is in general required to create the metadata mapping between a first cloud manager type and a second cloud manager type in a database by a technical person. The metadata mapping in the present disclosure refers to establishing the metadata correspondence between databases of the first cloud manager and the second cloud manager according to database types of the both, for example, the two databases may have a common index and so on, so that data in one database may be found by the corresponding data in another database.

According to one embodiment of present disclosure, before the technical scheme of the present disclosure are implemented, it is in general required to check in advance whether the environment for performing the cloud migration meets some pre-requisites, and customers need to input some information to support such check and judgment. For example, these pre-requisites may be, but not limited to: 1. The cloud migration to be performed should be able to support the type of the first cloud manager and the type of the second cloud manager; 2. For VMs to be migrated, the physical hosts running them should be supported by both the first cloud manager and the second cloud manager, and only if so, the as-is physical host of the first cloud manager and VMs run thereon can be migrated to the second cloud manager; 3. The cloud redirector should be able to access physical hosts and databases of cloud managers directly, accessing physical hosts and cloud managers directly can support that the cloud redirector switches the management chain between the first cloud manager and the second cloud manager, for example, "SSH" or key file are used to manage the configuration of physical hosts, and accessing databases of the first cloud manager and the second cloud manager directly can support migration of the instance data and the status data of VMs; 4. Attributes (e.g. host types, configuration items, function definitions, etc) of database of the first cloud manager and database of the second cloud manager should be able to be mapped with each other, which can be realized by an expert establishing predefined metadata mapping of the database level before the cloud migration; 5. There is no configuration conflict between agents of the first cloud manager and agents of the second cloud manager; 6. There is no need to change physical hosts running VMs or the network.

According to another embodiment of present disclosure, it is also possible to acquiesce that these pre-requisites are met instead of checking whether the environment where the cloud migration is performed meets these pre-requisites in advance. In this way, in a case that an actual environment of cloud migration has met these pre-requisites, it is not necessary to perform such checking in advance.

Furthermore, according to one embodiment of present disclosure, when disposing the cloud redirector 320 according to an embodiment of the present disclosure, it is required to verify the cloud redirector 320' accesses to the physical hosts 203 and 204 as well as the first cloud manager 201 and the second cloud manager 302. The public (secure shell protocol) SSH key of the cloud redirector 320 is disposed, or user names and passwords of physical hosts and/or cloud managers for verification are collected, so that these physical hosts and cloud managers can be accessed directly. Here, SSH is a protocol for providing secure remote login and other secure network services on an unsecured network.

Figure 8:
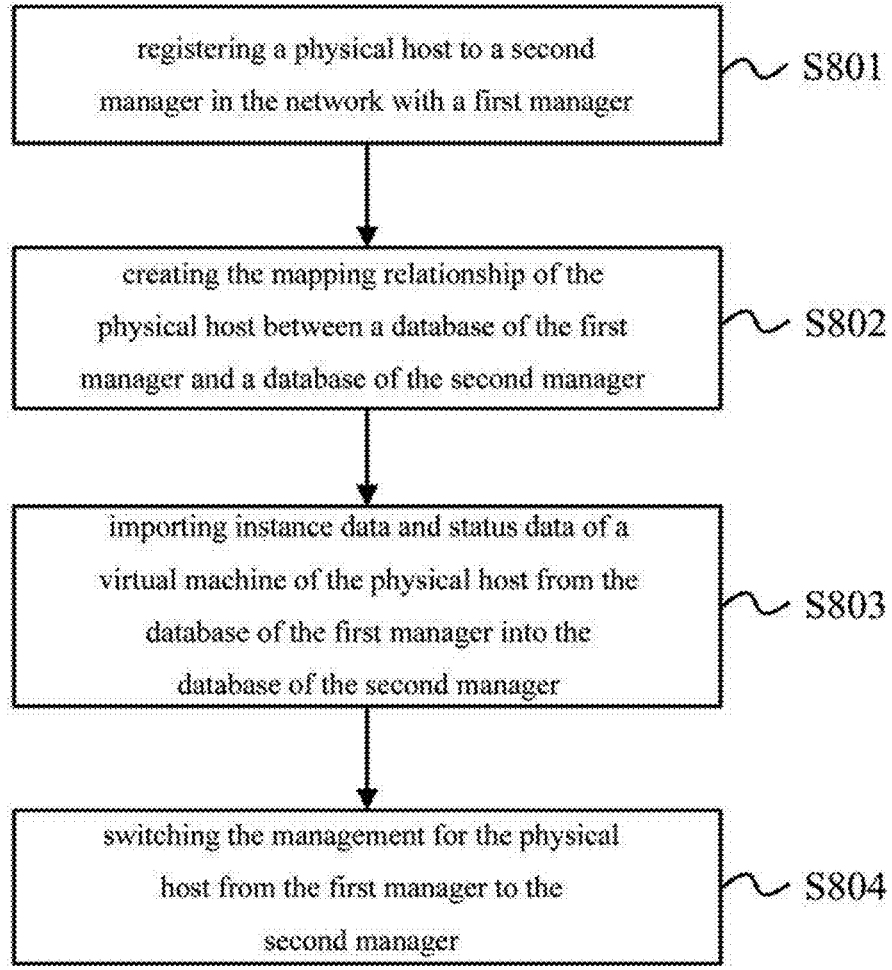
FIG. 8 is a flowchart showing a method for migrating virtual assets according an embodiment of the present disclosure.

FIG. 8 is a flowchart showing a method for migrating virtual assets according an embodiment of the present disclosure. In the method for migrating virtual assets according to an embodiment of the present disclosure, the cloud side has a first manager, physical hosts and VMs running on the physical hosts which are connected over networks. As shown in FIG. 8, at block S801, physical hosts are registered to a second manager in the network where the first manager is located. At block S802, the mapping relationship of physical hosts between the database of the first manager and the database of the second manager is created. At block S803, instance data and status data of VMs of physical hosts in the database of the first manager are imported into the database of the second manager. At block S804, the management of physical hosts is switched from the first manager to the second manager.

According to one embodiment of present disclosure, the above method further includes blocks of setting up a new server in the network, installing the second manager on the new server and starting the second manager. According to one embodiment of present disclosure, the above method further includes blocks of extracting the installation package of a controller agent and its configuration information from the second manager, the controller agent is used to receive instructions from the second manager and to return the result to the second manager.

According to one embodiment of present disclosure, in the above method, the block of registering physical hosts to the second manager in the network includes: stopping the management service of the first manager; installing the controller agent of the second manager on physical hosts; configuring and running the controller agent so as to register the physical hosts to the second manager. In the above embodiment, the block of stopping the management service of the first manager and the block of installing the controller agent of the second manager on the physical hosts may be performed simultaneously, or may be performed in a reverse order. The order of performing them does not limit the scope of the present disclosure.

According to one embodiment of present disclosure, in the above method, the block of creating the mapping relationship of physical hosts includes blocks of extracting the identity information of physical hosts, locating the records related to the physical hosts in databases of both the first manager and the second manager based on the identity information, and establishing the mapping relationship of the physical hosts in the two databases according to the located records, in which the identity information includes at least one of the ip address, mac address, the host name, id and guid.

According to one embodiment of present disclosure, in the above method, the block of importing instance data and status data of VMs of physical hosts from the database of the first manager into the database of the second manager includes blocks: stopping the controller agent of the first manager on physical hosts; stopping the management service of the second manager; extracting information data of physical hosts as well as instance data and status data of VMs thereof from the database of the first manager based on the mapping relationship; extracting information data of physical hosts from the database of the second manager based on the mapping relationship, in which information data of physical hosts extracted from the database of the second manager are taken as docked point data; converting instance data and status data of the database of the first manager into instance data and status data of the database of the second manager according to predefined metadata mapping in databases; and importing the converted instance data and status data into the database of the second manager by referring to the docked point data.

According to one embodiment of present disclosure, in the above method, the block of switching the management for physical hosts from the first manager to the second manager includes blocks of starting the management service of the second manager, starting the controller agent of the second manager on the physical hosts, verifying the status of the second manager, and removing the controller agent of the first manager from the physical hosts.

According to one embodiment of present disclosure, the above method further includes a block of starting the management service of the first manager. In the above, respective embodiments according to the present disclosure are described in combination with attached drawings. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for migrating virtual assets over a network having a first manager and a physical host connected, the physical host having a virtual machine run thereon, the method comprising:
    registering the physical host to a second manager in the network;
    creating a mapping relationship for the physical host between a database of the first manager and a database of the second manager, wherein the mapping relationship of the physical host in the two databases is based on records of the physical host in the databases of both the first manager and the second manager;
    importing instance data and status data of the virtual machine of the physical host from the database of the first manager into the database of the second manager;
    switching management for the physical host from the first manager to the second manager,
    wherein creating the mapping relationship of the physical host comprises:
        extracting an identity information of the physical host;
        locating a record of the physical host in the databases of both the first manage and the second manager based on the identity information; and
        establishing the mapping relationship of the physical host in the two databases according to the located record.

2. The method according to claim 1, further comprising:
    setting up a new server in the network;
    installing the second manager on the new server; and
    starting the second manager.

3. The method according to claim 2, wherein registering the physical host to the second manager in the network comprises:
    stopping management service of the first manager;
    installing a controller agent of the second manager on the physical host; and
    configuring and running the controller agent so as to register the physical host to the second manager.

4. The method according to claim 3, further comprising extracting an installation package of the controller agent and the configuration information thereof from the second manager, the controller agent used for receiving instructions from the second manager and returning the result to the second manager.

5. The method according to claim 1, wherein importing instance data and status data of the virtual machine of the physical host from the database of the first manager into the database of the second manager comprises:
    stopping a controller agent of the first manager on the physical host;
    stopping the management service of the second manager;
    extracting information data of the physical host as well as instance data and status data of its virtual machine from the database of the first manager based on the mapping relationship;
    extracting information data of the physical host from the database of the second manager based on the mapping relationship, the information data extracted from the database of the second manager taken as docked point data;
    converting the instance data and status data in the database of the first manager into the instance data and status data in the database of the second manager according to predefined metadata mapping in the databases; and importing the converted instance data and status data into the database of the second manager by means of the docked point data.

6. The method according to claim 1, wherein switching the management for the physical host from the first manager to the second manager comprises:

starting the management service of the second manager;
starting a controller agent of the second manager on the physical host;
verifying the state of the second manager; and
removing a controller agent of the first manager from the physical host.

* * * * *